(12) United States Patent
Van Ostrand (10) Patent No.: US 7,751,663 B2
(45) Date of Patent: Jul. 6, 2010

(54) BACKSIDE REFLECTION OPTICAL DISPLAY

(75) Inventor: Daniel K. Van Ostrand, The Woodlands, TX (US)

(73) Assignee: Uni-Pixel Displays, Inc., The Woodlands, TX (US)

( * ) Notice: Subject to any disclaimer, the term of this patent is extended or adjusted under 35 U.S.C. 154(b) by 0 days.

(21) Appl. No.: 11/524,704

(22) Filed: Sep. 21, 2006

(65) Prior Publication Data

US 2008/0075414 A1 Mar. 27, 2008

(51) Int. Cl.
G02B 6/26 (2006.01)
(52) U.S. Cl. .......................... 385/39; 385/31; 362/627
(58) Field of Classification Search ............. 385/16–19, 385/146, 901, 31, 39; 362/623–625, 627, 362/629
See application file for complete search history.

(56) References Cited

U.S. PATENT DOCUMENTS

| | | | |
|---|---|---|---|
| 3,748,018 A | 7/1973 | Borden, Jr. | |
| 5,098,861 A * | 3/1992 | Blackstone | 438/406 |
| 5,391,410 A | 2/1995 | Nii et al. | |
| 5,396,350 A | 3/1995 | Beeson et al. | |
| 5,928,801 A | 7/1999 | Broer et al. | |
| 5,978,056 A | 11/1999 | Shintani et al. | |
| 6,195,140 B1 | 2/2001 | Kubo et al. | |
| 6,211,853 B1 * | 4/2001 | Takeuchi et al. | 345/108 |
| 6,381,381 B1 | 4/2002 | Takeda et al. | |
| 6,463,192 B1 * | 10/2002 | Kapany | 385/17 |
| 6,470,115 B1 | 10/2002 | Yonekubo | |
| 6,591,037 B2 | 7/2003 | Yonekubo | |
| 6,671,016 B1 | 12/2003 | Kim | |
| 6,693,689 B1 | 2/2004 | Kim et al. | |
| 6,724,459 B2 | 4/2004 | Yoon | |
| 6,724,973 B1 | 4/2004 | Takeuchi et al. | |
| 6,801,277 B2 | 10/2004 | Ting et al. | |
| 7,059,725 B2 | 6/2006 | Hirata et al. | |
| 7,095,465 B2 | 8/2006 | Lin | |
| 7,106,402 B2 | 9/2006 | Suzuki et al. | |

(Continued)

FOREIGN PATENT DOCUMENTS

JP 7287176 A 10/1995

(Continued)

OTHER PUBLICATIONS

International Search Report and Written Opinion received in PCT/US2007/079159 mailed on Apr. 1, 2008, 12 pages.

*Primary Examiner*—Sarah Song
(74) *Attorney, Agent, or Firm*—Fletcher Yoder (57) ABSTRACT

The disclosure generally involves an optical (perhaps flat panel) display utilizing backside reflection for time-multiplexed optical shuttering. One display comprises a side-illuminated light guide associated with conditions for total internal reflection. A first surface of the light guide is elastomeric. Disposed against this elastomeric surface is an active layer that selectively deforms the elastomeric surface in locations that can correspond to display pixels. This resulting change in the geometry of the elastomeric surface can be sufficient to defeat the conditions for total internal reflection. When appropriate, light is reflected by the particular deformation and is ejected from another surface of the light guide. In this case, each location that allows light to exit could represent an activated display pixel. In certain situations, color flat panel displays of varying sizes may further implement field sequential color and time-multiplexed optical shuttering.

46 Claims, 9 Drawing Sheets

U.S. PATENT DOCUMENTS

| | | | |
|---|---|---|---|
| 7,184,615 B2 * | 2/2007 | Levola | 385/8 |
| 2002/0105709 A1 | 8/2002 | Whitehead | |
| 2003/0026582 A1 * | 2/2003 | In'T Hout et al. | 385/140 |
| 2003/0133285 A1 * | 7/2003 | Ludwig et al. | 362/31 |
| 2004/0061665 A1 | 4/2004 | Van Gorkom | |
| 2006/0034566 A1 * | 2/2006 | Wakita et al. | 385/31 |
| 2006/0128049 A1 * | 6/2006 | Jaiprakash et al. | 438/53 |

FOREIGN PATENT DOCUMENTS

| | | | |
|---|---|---|---|
| JP | 10078549 A | | 3/1998 |
| JP | 2006030630 A | * | 2/2006 |
| WO | 01/63588 A | | 8/2001 |
| WO | 03/050788 A | | 6/2003 |
| WO | 2004/088629 A | | 10/2004 |
| WO | 2006/008702 A | | 1/2006 |

* cited by examiner

BACKSIDE REFLECTION OPTICAL DISPLAY

TECHNICAL FIELD

The present disclosure generally relates to the field of display devices and, more particularly, to an optical (perhaps flat panel) display utilizing backside reflection.

BACKGROUND

Certain flat panel displays exploit the principle of frustrated total internal reflection (FTIR) to induce the emission of light from the respective system. Such displays may be achieved through the utilization of microelectromechanical systems or nanoelectromechanical systems (often collectively referred to as MEMS). For example, one representative of FTIR-based MEMS devices may be a time multiplexed optical shuttering (TMOS) display. These TMOS devices may each be generally able to selectively frustrate the light undergoing total internal reflection within a (generally) planar waveguide. When such frustration occurs, the selected region of frustration may constitute a pixel capable of external control.

SUMMARY

At a high level, this disclosure describes optical displays incorporating or otherwise using backside reflection. More specifically, in certain embodiments, a flat panel or other TMOS display may present pixels that are activated by violating the conditions for total internal reflection within a light guide or its light guidance substrate. For example, an optical component may include a light guide adapted to conduct light wherein at least some portion of the light guide is deformable and an active layer disposed on the light guide whereby the active layer selectively reflects light by deforming a first surface of the light guide such that light is ejected from a second surface of the light guide. In certain situations, the deformable portion of the light guide may be a deformable elastomer layer. The deformable elastomer layer can then be disposed between the first surface of a light guidance substrate of the light guide and the active layer.

In another example, an optical display comprises a light guide adapted to conduct light under conditions of total internal reflection, with at least a portion of the light guide being deformable. An active layer is disposed on the light guide whereby the active layer selectively reflects light by selectively deforming a first surface of the light guide such that light is ejected from a second surface of the light guide. The display also includes a light source—potentially capable of outputting alternating pulses of primary colored or infrared light—coupled with the light guide.

In a further example, an optical display comprises a light guide adapted to conduct light under conditions of total internal reflection where at least a portion of the light guide is deformable. A plurality of modular active layer disposed in an arrayed manner on a deformable surface of the light guide whereby the modular active layer reflects light by selectively deforming a first surface of the light guide such that light is ejected from a second surface of the light guide. This display also includes a light source—potentially capable of outputting alternating pulses of primary colored or infrared light—coupled with the light guide.

To control these example displays or components thereof, instructions may be executed as appropriate. The instructions may cause a light source to output alternating pulses of light through a light guide adapted to conduct light under conditions of total internal reflection, with at least a portion of the light guide being deformable. The instructions may (often concurrently) selectively apply an electrostatic field to an active layer disposed on a first side of the light guide to deform a particular portion of the first surface of the light guide such that the light is ejected from a second surface of the light guide.

A method for fabricating such optical displays may include selecting a light guide adapted to conduct light under conditions of total internal reflection, with at least a portion of the light guide being deformable. The method may further include coupling a light source, capable of outputting alternating pulses of light, to the light guide and arranging a plurality of modules on the light guide. Each module could comprise an active layer and a driving layer, with the active layer disposed on a first surface of the light guide such that light is ejected from a second surface of the light guide upon selective deformation of the active layer by the driving layer.

The foregoing methods—as well as other disclosed example methods—may be computer managed or implementable. For example, the display may include processors or other control architecture that implements some or all of the example techniques. Put another way, some or all of these features or aspects may be further included or implemented in respective software. Generally, such features or aspects of these and other embodiments are set forth in the accompanying drawings and the description below. For example, some of these embodiments may be able to locally violate the conditions of total internal reflection on the surface of the waveguide that is opposite (and typically parallel) to the surface from which light is ejected. In this case, the optical path between the viewer and the light ejected from the display can be less obstructed, thereby resulting in a brighter, more efficient display. Indeed, a MEMS-based or other active layer may not be made of optically transparent materials since it will not lie within the optical path of the viewer. Therefore, a wider range of materials may be considered, which can result in cost reduction. Also, this may allow flat panel displays to be constructed of smaller modular components of fixed cost that have a more linear cost curve. This cost savings could make very large displays (e.g. optical display billboards) more affordable and easier to realize.

Another advantage potentially provided by such backside reflection could include a more parallel manufacturing or fabrication process. For example, the described displays could be manufactured with more independent, interchangeable parts that benefit from a parallel manufacturing process. In other words, the interchangeable parts may be fabricated independently and assembled into a final product, thereby possibly reducing production costs as well as the overall time of production. Further, interchangeable parts can facilitate repair.

Of course, these example features are for illustration purposes only and some or all may not be fully present (if at all) in certain embodiments. Other features, objects, and advantages will be apparent from the description and drawings and from the example claims.

DETAILED DESCRIPTION

Figures 1, 2, 3:
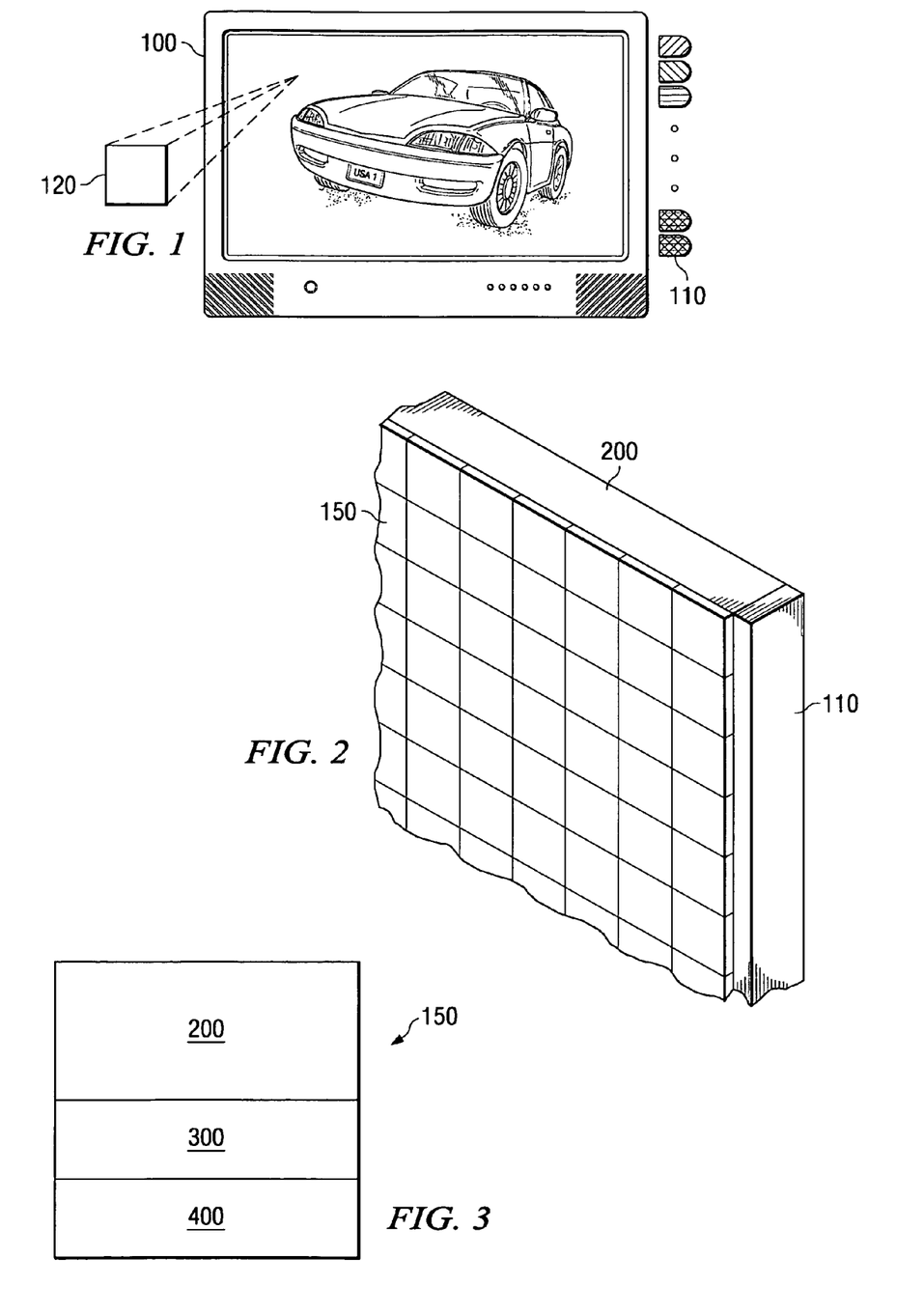
FIG. 1 illustrates an example display according to certain embodiments of the present disclosure.
FIG. 2 is a more detailed illustration of a portion of the (perhaps large scale) display in FIG. 1 showing some of the example self-contained modules.
FIG. 3 provides a high level view of the three layers assembled to form the portion of the display of FIG. 2.

At a high level, FIG. 1 illustrates an example optical display device 100 that may utilize backside reflection as described herein. Generally, backside reflection indicates that the display 100 allows for the deformation of a first surface of a light guide such that light is ejected from a second surface of the light guide. In other words, backside may be used to indicate any side or other portion of the light guide apart from that emitting the particular light. In some implementations, this display device 100 may be a flat panel display for computers, cell phones and PDAs, televisions, automobiles, medical or diagnostic applications, military and avionics, or in any other suitable application or system. For example, display 100 may be implemented in a laptop (or other handheld) computer because the potential energy-efficiency may extend the battery life. Also, display 100 may be more sunlight readable with higher resolution. In another example, display 100 may display images up to three times higher in resolution, thereby enhancing diagnostic capabilities. This display 100 may also be operable to provide a viewing angle greater than 170 degrees, thereby giving the viewer exceptional latitude in positioning or locating the display 100. Moreover, these displays may be bendable (like fiber optic cable) with a radius of curvature of over 20 times the display's thickness. In such an example, display 100 may be used in outdoor systems because of its flexibility and ruggedness.

Generally, the present disclosure discusses an optical display 100 that emits light by disposing guidance deforming components (such as an active layer 300) on one surface of an optical waveguide (or light guide) such that light is reflected or otherwise ejected from another surface. The deformation of the light guide frustrates total internal reflection causing light to be ejected locally at the surface opposing some portion of each deformation. More specifically, by selectively deforming one surface of a light guidance substrate such that the conditions for total internal reflection within the light guidance substrate are locally violated, light within the light guidance substrate is reflected at these deformations at an angle sufficient to exit the light guide at another surface of the light guide.

As shown in FIG. 1, each of these deformations in display 100 may represent a display pixel 120. A typical display 100 could contain an embedded matrix of over a million such pixels according to the resolution requirements or desires of a given application. In some cases, MEMS devices—whether microelectromechanical systems or nanoelectromechanical systems—are disposed at the location of each pixel 120 to selectively violate the conditions for total internal reflection on the deformable surface of the light guide 200. For example, these example pixels can be configured as a MEMS device using a parallel plate capacitor system that propels a deformable membrane between two different positions and/or shapes. One position or shape corresponds to a quiescent, inactive state where FTIR does not occur due to inadequate proximity of the membrane to the waveguide. The other position or shape corresponds to an active, coupled state where FTIR does occur due to adequate proximity. These two states correspond to off and on states for the display pixel 120.

An aggregate MEMS-based structure may form an active layer 300 (shown in FIG. 3) that, when suitably configured, functions as a TMOS video display capable of color generation, usually by exploiting field sequential color and pulse width modulation (PWM) techniques. Regardless of the particular implementation, the active layer (300) may be disposed outside the optical path of the viewer such that the light can ejected from the surface of the light guide that is not the same side as each respective deformation. Consequently, the active layer 300 does not need to be transparent and may be comprised of cheaper or more resilient opaque materials. For example, when the "back" surface of the light guide is actuated, light can be ejected from the "front" surface of the light guide, as perceived by a viewer. Also, driving circuitry may be disposed on the active layer 300 using any suitable circuit printing techniques. Indeed, because it does not necessarily lie within the optical path of the viewer, the active layer 300 may be designed or fabricated as a self-contained modular unit 150 that can contains driving circuitry as appropriate. More specifically, as shown in FIG. 2, a rectangular array of such MEMS-based pixel regions 150, which are often controlled by electrical/electronic components, can be fabricated "behind" the active surface of the planar waveguide. In this fashion, a plurality of such modular units 150 can be arrayed or otherwise coupled to a very large light guide 200 in such a manner that helps achieve a flat panel or other optical display of very large dimensions, such as in an optical billboard, highway sign, trade show signage and kiosks, and other large scale application. Moreover, since the active layer 300 can be fabricated independent of the light guide, its fabrication is not dependent upon the final size of the light guide. Further, these components may be manufactured or distributed by multiple manufacturers and vendors without tight process control or compatibility concerns. In other words, self contained modular units may be fabricated at any time for multiple vendors or distributors and subsequently arrayed on the desired light guide during final assembly. In addition, some of these parts may be fabricated in a manner that is substantially independent of one another and then assembled in a final assembly process. In some circumstances, this enables a manufacturing process that is more parallel, perhaps using multiple manufacturers. In this embodiment, no portion of the active layer 300 needs to be fabricated on the light guide.

Disposed along at least one edge of the light guide 200 is a light source 110 capable of emitting pulses of light. This light source 110 may be operable to emit visible light, infrared, or any other suitable light wave. For example, an infrared lamp may be disposed next to colored lamps. The sources are chosen to emit the primary colors of visible light to achieve the desired color gamut of the display. Typically the sources are red, green and blue light emitting diodes that can be temporally multiplexed to provide the familiar color gamut known to color displays. In this example, short bursts of red, green and blue light are emitted through the same dot so quickly that the eye also sees them as a single color. In this case, different durations of red, green and blue create different shades and hues. More specifically, the duration of the charge helps control the opening and closing of the particular pixel. It is this duration that can determine the relative intensity of the color. One frequency for a full cycle of such alternations (red-green-blue) is typically 1/60 second. Thus every second, red, green and blue are flashed into the guidance substrate 60 times each, meaning roughly 180 flashes total of all colors combined in a second. For example, to produce a white background, each appropriate pixel is open for the entire duration of the red, green and blue cycles. To produce black text on the white background, each pixel representing a letter (or portion thereof) is closed for the entire duration of each cycle. In another example, to produce fifty percent gray, each respective pixel is open for 50 percent of each red, green and blue cycle. In yet another example, to produce a blue background, each appropriate pixel is closed during red and green cycles, but open during the blue cycle. The shade of blue is determined by the percentage of the blue cycle that the pixel is open (perhaps 10%=deep blue and 100%=bright blue). In short, each pixel can be left open for different percentages of the red, green and blue cycles to produce millions of different colors and shades of gray, a technique commonly referred to as pulse width modulation (PWM). But it will be understood that optical display 100 may be used for any suitable purpose and any light and/or color may be used. For example, an infrared light source 110 can be utilized if such an application is appropriate. In this example, a color display 100 could be converted to an infrared display 100 by shutting down the red-green-blue cycle (or removing the RGB source) and coupling a continuous infrared source to the light guide.

For a color display using time multiplexed optical shuttering (TMOS), the light source 110 comprises a plurality of sources capable of outputting alternating pulses of monochromatic light, such as light emitting diodes (LEDs). To increase distribution and mixture of tristimulus light within the light guide 200, a linearly arrayed concatenation of LEDs may be used. The individual LEDs may be simplex or triplex structures based, at least in part, on an application's dimensional and power dissipation considerations. A simplex LED is a discrete element that emits only one primary color. A triplex LED combines all three tristimulus primaries within a more unitary package (where the respective junctions may even share a common reflector and potting compound). The mounting for these linear arrays may also serve as the primary heat sink for these power-intensive illuminating systems.

Often, the geometry of the encapsulating structure in which the junction is embedded helps determine the optimal separation between the light guide 200 insertion face and the light source 110. The consequence of this physical separation is the trigonometric restriction on the angles of incidence of light encountering the insertion face. Moreover, Fresnel insertion losses apply to light entering light guide 200 from the surrounding air: maximum insertion occurs when the rays enter normal to the insertion face, while insertion becomes increasingly attenuated for rays at glancing angles. Typically, these issues do not arise for architectures that actually embed the light source 110 within light guide 200 or otherwise avoid ray transit through air prior to light travel within light guide 200. For example, the LEDs may be directly coupled to the light guide 200 by means of a silicone bridge, thereby improving the range of useful angles injected into light guide 200. The coupling of light at the interface of the actuated active layer 300 and light guide 200 may be based on geometric considerations involving the nature of the two surfaces making contact. For example, Parylene (which may be prepared by deposition on silicon wafers) may yield good optical coupling due to reduced surface roughness and better contact intimacy. In another example, materials that are not flat (such as latex) can still couple well under even slight pressure, since the compliance of the elastic material causes the latex to conform to the surface of the light guide 200, thereby providing intimacy of contact without benefit of an initially high surface flatness specification. In fact, a hybridized structure where latex coating is added onto a membrane may be used. In some cases, intimacy of contact over a sufficiently large (>3λ) area may provide a sufficient coupling.

FIG. 3 provides a high level view of the three layers assembled to form one portion of the display. The light guide 200, active layer 300, and driving layer 400 can all be manufactured separately and in parallel. Each of the three layers can be assembled together at the end of the production process to yield a completed display 100. In fact, each layer may not be manufactured to the same planar dimensions, which can be varied for each part to optimize cost and performance criteria. For example, since the drive circuit 422 for the driving layer 400 can be printed on the back of the substrate 420, the driving layer 400 when combined with an active layer 300 can function as a self-contained modular unit 150.

Figure 4A:
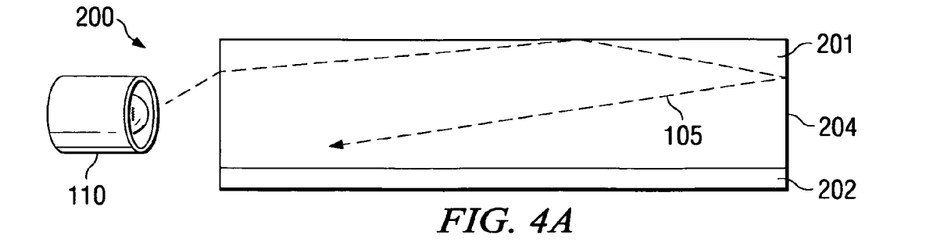
FIGS. 4A-D are example views of the light guide described in FIG. 3, the state of the light guide during pixel activation, and a magnification of the situs of such pixel activation.

FIG. 4A shows the light guide 200, often comprising a generally planar light guidance substrate 201. The light guidance substrate 201 is normally manufactured using an optically transparent material of high refractive index such as glass or plastic. For example, high quality optical glasses may be used. In another example, certain polymer substrates may be selected because of lower densities (and a corresponding lower weight per screen), lower cost, and superior mechanical robustness. More specifically, light guide substrate 201 may also be fabricated using any number of other polycarbonates with sufficient clarity, perfluoropolymers configured to achieve some parity with optical glass, hollow waveguides, or any other suitable materials or components. FIG. 4A further depicts a light ray 105 injected into the light guide 200 from the light source 110 and channeled within the light guide 200 via total internal reflection. More specifically, light entering the light guidance substrate 201 from the light source 110 is refracted such that the incident light experiences total internal reflection within the light guidance substrate 201. In some cases, the side surfaces of the light guide may be mirrored 204 to prevent light from escaping at the edges. The light guidance substrate 201 is composed of a rigid, transparent material of optical quality. In this illustrated embodiment, a deformable elastomer layer 202 is disposed upon a first surface of the light guidance substrate 201. The deformable elastomer layer 202 is normally optically transparent and its index of refraction is sufficiently matched to the index of refraction of the light guidance substrate 201 so that there is no substantial optical boundary between the deformable elastomer layer 202 and the light guidance substrate 201. In many cases, the two structures function as a single light guide 200 such that conditions for total internal reflection may exist within the entire structure. The light guide 200 is designed to channel or guide light received from the light source 110 under conditions that satisfy total internal reflection. For example, the light guide 200 may have mirrored surfaces 204 on sides against which a light source 110 is not disposed, which may help minimize optical losses.

Figure 4B:
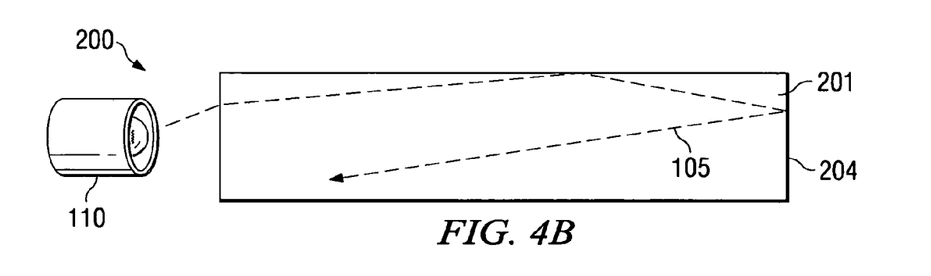

FIG. 4B shows an alternative embodiment of a light guide 200. In this situation, the illustrated portion of light guidance substrate 201 is comprised of a deformable elastomer of high refractive index. Accordingly, there may be no need for a deformable elastomer layer to be disposed upon the light guidance substrate 201. Any surface of the light guide 200 is thus capable of undergoing selective local deformation.

Figure 4C:
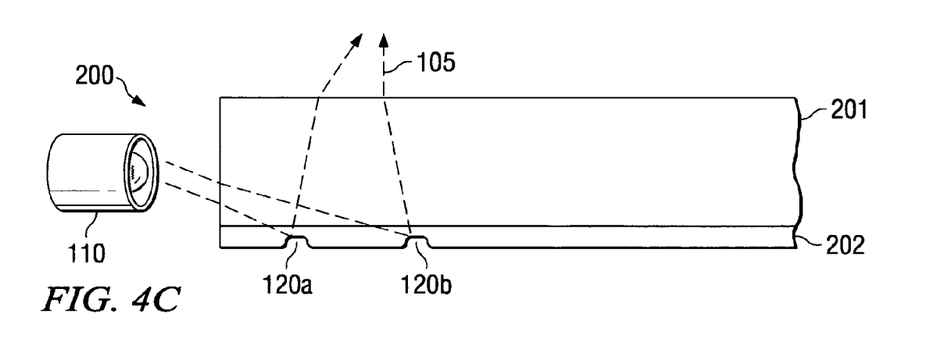

FIG. 4C shows the state of the light guide 200 during pixel activation. Prior to pixel activation, the light rays 105 within the light guide 200 typically do not strike either large surface of the light guide 200 at an angle of incidence great enough to overcome total internal reflection. The deformable elastomer layer 202 has been pushed upward at the surface by the active portion of the flexible membrane 110 (not shown) resulting in a deformation. The light rays 105 within the light guide 200 contact the boundary of the deformable elastomer layer 202 at the situs of the deformation. That light is reflected at an angle sufficient to exit the light guide 200 at the surface opposite to the deformation, which is normally the so-called front or viewable surface of the display 100.

Figure 4D:
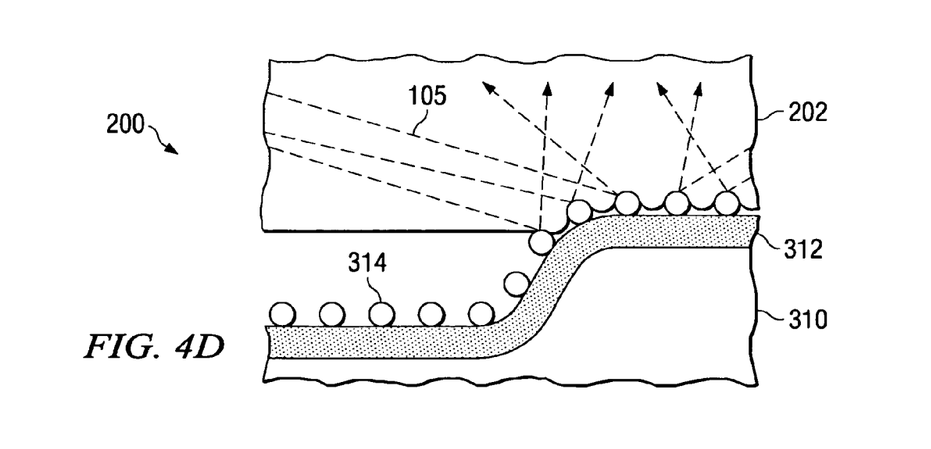

FIG. 4D shows a magnified view of the light guide 200 near the situs of pixel activation. The scale is exaggerated to more clearly show the features. In embodiments that include a coating of small asperities 314 disposed on the surface of the common conductor 312, these asperities ensure multiple reflection points within the pixel area to maximize light output. These reflection points are caused when the surface of the deformable elastomer layer 202 is not smoothly deformed. The small 314 asperities cause multiple surface deformations across the entire pixel area as opposed to only a single global deformation for each pixel.

The selective deformation of a first surface of the light guide 200 results in light being locally ejected from a second surface of the light guide 200. Every component required to activate the pixel, in relation to the viewer, lies behind the surface from which light is reflected out of the light guide 200. Except for any protective coatings used in commercial applications, the optical path between the viewer and the point at which light is ejected from the light guide 200 is relatively unobstructed. More specifically, there may be no transparent conductors, thin film transistors, cladding layers, and such to cause loss. Furthermore, there is no need for the materials in the active layer 300 or driving layer 400 to be optically transparent. In fact, the common conductor 312 is often dark in color and non-reflective. This enables the substrate 420 to be made of an opaque material such as a wafer or printed circuit board. The drive circuit 422 can be disposed on the back of the substrate 420 using common, low-cost circuit board manufacturing techniques.

Figure 5A:
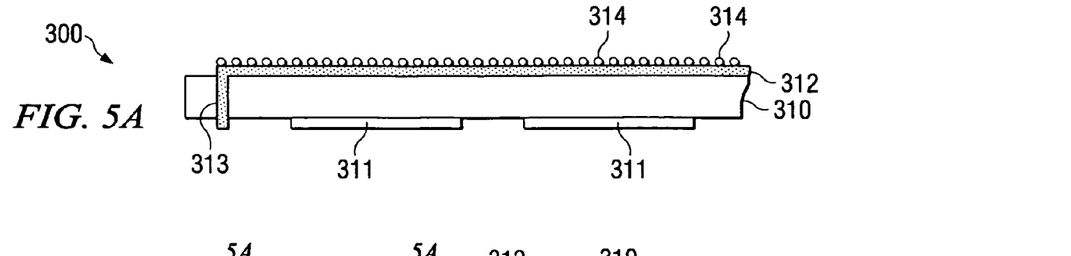
FIGS. 5A-B illustrate example views of the active layer according to certain embodiments of FIG. 3.

FIG. 5A shows the active layer 300 of the display. The words top and bottom are used herein only in reference to the orientation of the figures as shown. The active layer 300 is comprised of a flexible membrane 310. In the preferred embodiment, the flexible membrane 310 is composed of a material or device that changes position and/or shape in response to an applied electrostatic field and in a manner that is well-suited to external control. Such materials include electro-active polymers like polyvinylidine difluoride (PVDF), metallized piezoelectric films and a wide range of MEMS devices that can produce the required localized dimensional change. This disclosure contemplates other embodiments of selective localized activation or deformation well-suited to external control that respond to electrostatic, electromagnetic, electrochemical or thermal stimuli.

Figure 5B:
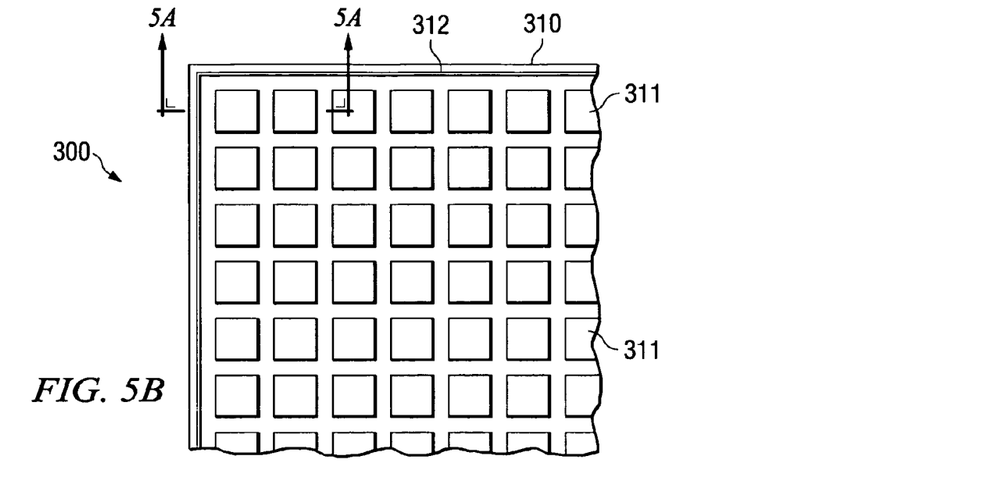
Figure 6A:
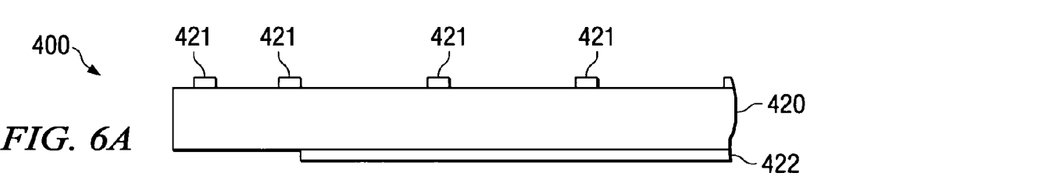
FIGS. 6A-B illustrate example views of the driving layer according to certain embodiments of FIG. 3.

Pixel conductors 311 are patterned on the bottom surface of the flexible membrane 310. An opaque common conductor 312 is disposed on the top surface of the flexible membrane 310. The common conductor 312 is typically non-reflective so that light is not coupled into the active layer 300 when it comes into contact with the light guide 200. The surface of the common conductor 312 is preferably black in color to improve the contrast ratio of the emitted light, since that is what the viewer sees when the pixel is off. The surface of the common conductor 312 may be coated with a layer of small asperities 314, such as glass beads. A through-hole conductor 313 extends from common conductor 312 on the top of the flexible membrane 310 to the bottom surface for the purpose of providing a contact point for the common conductor and the driving layer 400 shown in FIG. 6. FIG. 5B shows a bottom view of the active layer 300. Pixel conductors 311 are patterned on the bottom of the flexible membrane 310 at each situs where a display pixel is located.

FIG. 6A shows the driving layer 400. The driving layer 400 is comprised of a substrate 420, such as a silicon wafer, flex circuit, or printed circuit board. The driving layer 400 may be controlled by a processor or other control architecture (such as a video converter and field sequential color converter) that executes instructions and manipulates data to perform the operations of display 100. These control components may include, for example, a central processing unit (CPU), an application specific integrated circuit (ASIC) or a field-programmable gate array (FPGA). The display 100 could behave as a large dynamic RAM chip and be driven directly by video RAM in one-to-one correlation under an extremely rapid refresh regimen. In some systems, converters could be utilized with the present invention to permit compatibility with conventional television or with high definition television (HDTV). Moreover, the control components may collectively or individually execute software operable to manage the various layers and display components. For example, these instructions may be written or described in any appropriate computer language including C, C++, assembler, Perl, any suitable scripting language, or any combination thereof. Regardless of the particular implementation, "software" may include software, firmware, wired or programmed hardware, or any combination thereof as appropriate.

Figure 6B:
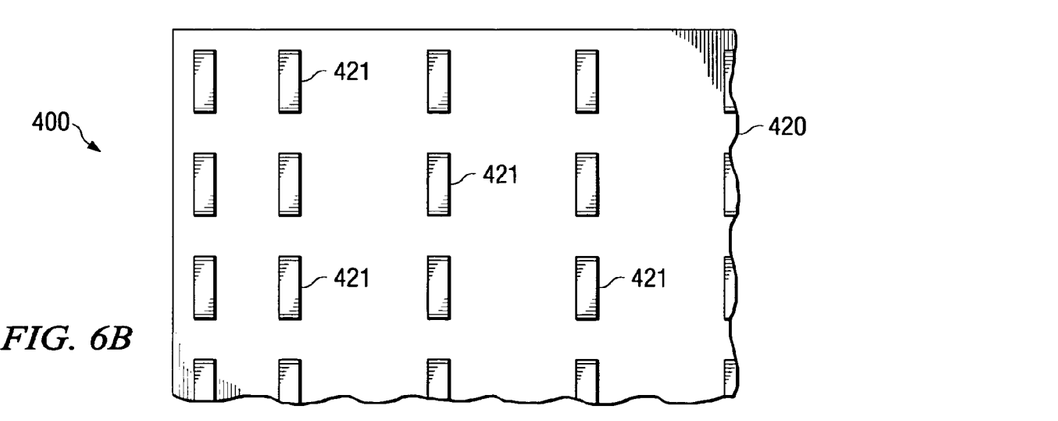

Returning to the illustrated embodiment, driving layer 400 may include a drive circuit 422 that can be placed on the bottom side of the substrate 420. In the illustrated example, a plurality of pad electrodes 421 is disposed on the top surface of the substrate 420. Each pad electrode 421 is disposed on the substrate 420 such that each pad electrode 421 can correspond to a pixel conductor 311 on the active layer 300. When the active layer 300 is brought into contact with the driving layer 400, each pad electrode 421 comes into contact with its corresponding pixel conductor 311 making an electrical connection. The through-hole conductor 313 will come into contact with a pad electrode 421 that drives the common conductor 312. The thickness of the pad electrodes 421 and any adhesive are typically sufficient to provide a standoff between the driving layer 400 and the active layer 300. FIG. 6B shows a top view of the driving layer 400.

Figure 7A:
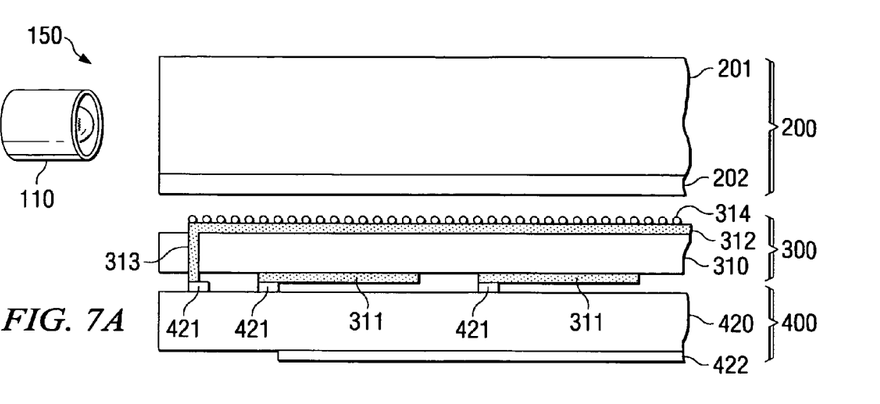
FIGS. 7A-C illustrate example views of a portion of the display in a quiescent state and with an activated pixel according to certain embodiments of the present disclosure.
Figure 7B:
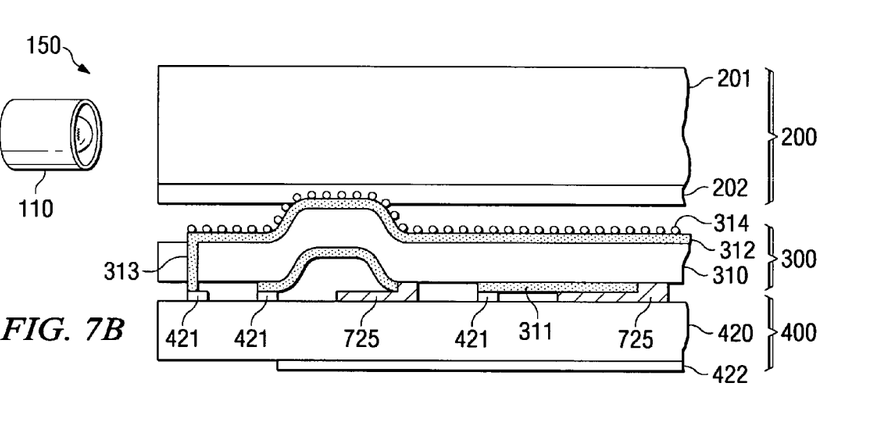
Figure 7C:
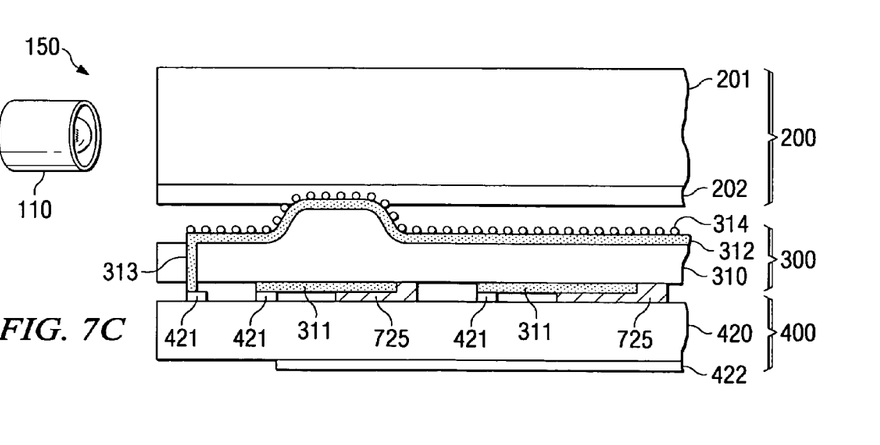

FIG. 7A shows the three layers (light guide 200, active layer 300 and driving layer 400) assembled to form any portion of display 100, such as module 150. The active layer 300 is disposed such that the common conductor 312 is brought into close proximity to (but normally not in contact with) the surface of the deformable elastomer layer 202 of the light guide 200. With regard to the example shown of FIG. 4B, either surface of the light guidance substrate 201 may be brought into close proximity with the active layer 300. Put another way, the "bottom" or the "top" of the light guidance substrate 201 may be immaterial in the long dimension. In some embodiments, the driving layer 400 is affixed to the active layer 300 such that the pad electrodes 421 line up with the pixel conductors 311. FIGS. 7B-C illustrate various materials that buckle or bulge under the influence of an electrostatic field, though materials that exhibit similar behavior under the influence of other stimuli may also be utilized.

Figure 8A:
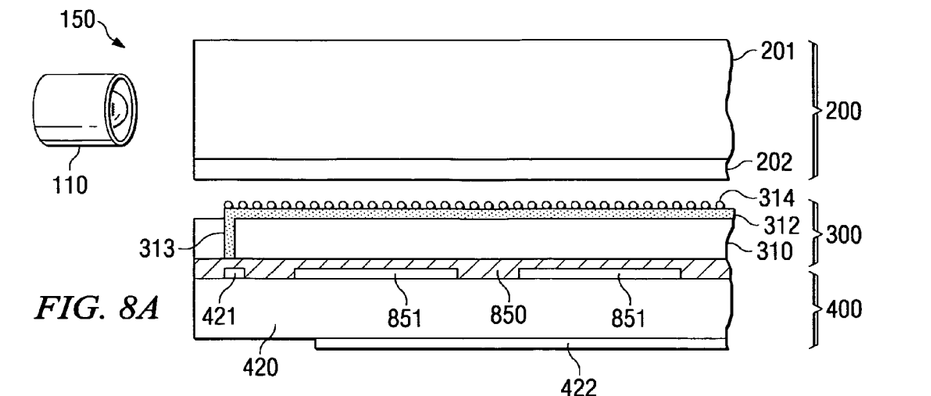
FIGS. 8A-B illustrate various views of another example portion of the display comprising an anisotropic conductive film adhesive (ACF) to activate a pixel according to certain embodiments of the present disclosure.

More particularly, FIG. 7B illustrates a material that expands predominantly in the horizontal direction (causing the flexible membrane 310 to buckle), while FIG. 7C illustrates a material that expands predominantly in the vertical direction (causing the flexible membrane 310 to bulge). FIG. 7B shows a display with an activated pixel. In the preferred embodiment, a pixel is activated by placing an electrostatic potential between the common conductor 312 and the pixel conductor 311 corresponding to the pixel that is to be activated. The flexible membrane 310 changes shape in a desired manner in response to the applied electrostatic field. This causes an upward local deformation of the flexible membrane 310 at the situs of the pixel being activated. As the flexible membrane 310 pushes upward, it contacts the deformable elastomer layer 202 of the light guide 200. The deformable elastomer layer 202 is mechanically pushed upward in a corresponding manner. This changes the geometry of the deformable elastomer layer 202, defeating the conditions for total internal reflection within the light guide 200. The deformation shown in FIG. 8 is more typical of a material that expands predominantly in the horizontal direction, causing the flexible membrane 310 to buckle. FIG. 7C shows the deformation of a material that expands predominantly in vertical direction, causing the flexible membrane 310 to bulge. An optional non-conductive shim 725 may be disposed between the substrate 420 and the pixel conductor 311 to further control the deformation of the flexible membrane 310. The non-conductive shim forces the flexible membrane 310 to bulge or buckle in the direction of the light guide 200 and not back toward the driving layer.

FIG. 8A shows another embodiment of the portion of the display 100, such as a module 150. In this case, anisotropic conductive film adhesive (ACF) 850 is used to selectively activate a particular pixel. ACF 850 can be a thermoset epoxy system that is generally conductive in one dimension and non-conductive in others. An ACF layer of any suitable thickness is disposed between the active layer 300 and the driving layer 400. The pixel is activated by means of a pixel electrode 851 and the excitation of ACF 850 that lies directly above it. The dimensions of pixel electrode 851 are often matched to the size of a display pixel. Pixel conductors 311 may not be necessary since their electrical function has been replaced by the layer of ACF 850.

Figure 8B:
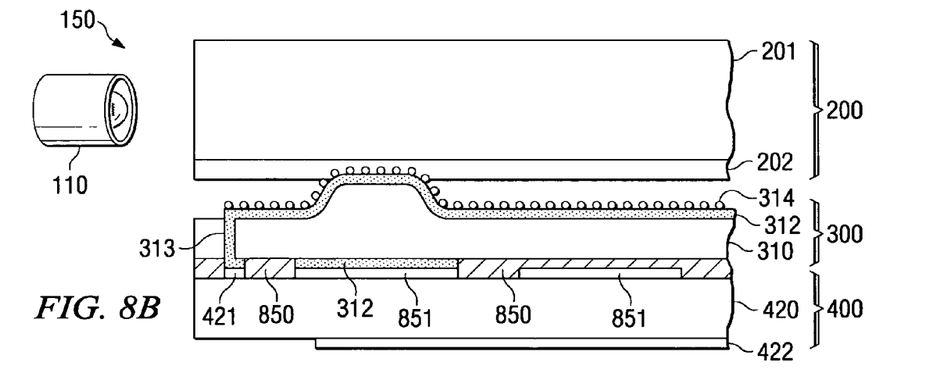

FIG. 8B shows the activation of a pixel shown in FIG. 8A slightly magnified. In this case, pixel activation is achieved via a conductive path with an electrical connection between the ACF 850 and the pixel electrode 851. Accordingly, ACF 850 is conductive only in the vertical direction and in the region bounded by the horizontally planar dimensions of the pixel electrode 851. This electrical connection creates a parallel plate capacitor between the shaded regions of ACF 850 and the common conductor 312 (except in the region where the through hole conductor 313 connects the ACF 850 to the common conductor 312). Upon charging, Coulomb attraction sets up an electrostatic field across the capacitor that deforms the flexible membrane 310.

Figure 9:
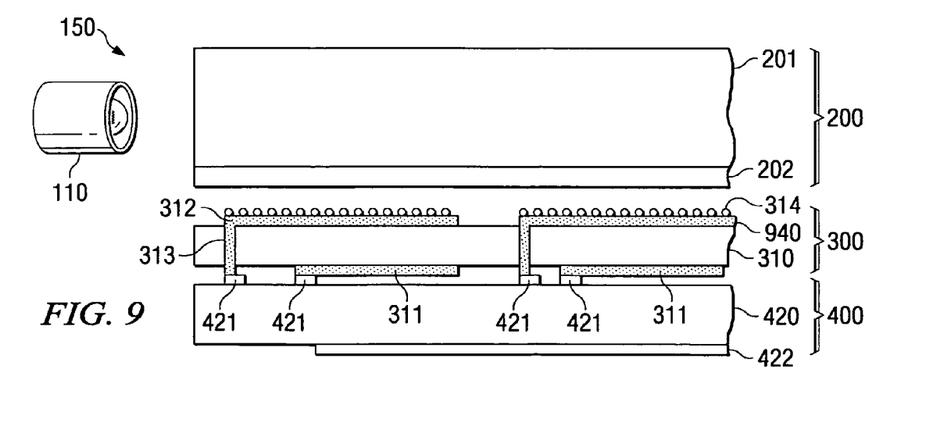
FIG. 9 shows a side view of another example portion of the display where a plurality of common conductors is disposed on the flexible membrane according to certain embodiments of the present disclosure.

FIG. 9 shows another embodiment of the portion of the display 100, such as a module 150. In this example, the common conductor 312 on top of the flexible membrane 310 in FIG. 3 is replaced with individual pixel conductors 940. This similarly creates a localized parallel plate capacitor at the situs of each pixel. Each individual pixel conductor 940 is connected to the driving layer 400 by means of a through-hole conductor 313. Additional pad conductors 421 are added to the substrate 420 of the driving layer to electrically connect each through-hole conductor 313.

Figure 10A:
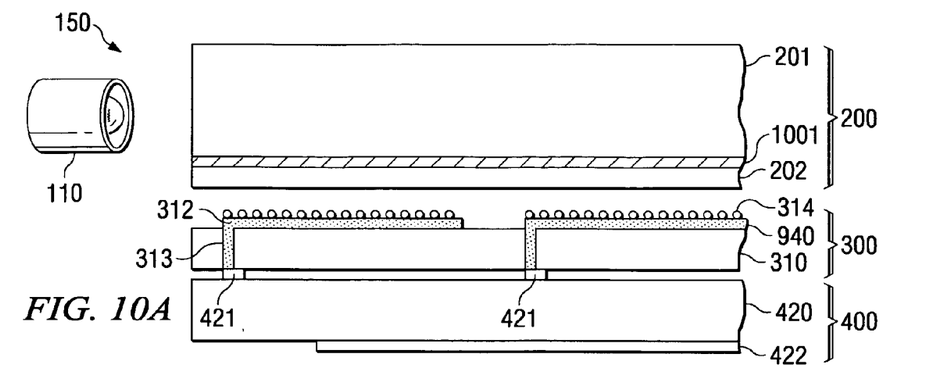
FIGS. 10A-B illustrate various views of another example portion of the display comprising a transparent common conductor disposed on a deformable elastomer layer according to certain embodiments of the present disclosure.

FIG. 10A shows another embodiment of the portion of the display 100, such as a module 150, wherein a transparent common conductor 1001 is disposed on the deformable elastomer layer 202. The transparent common conductor 1001 can be made from a material such as indium tin oxide. An individual pixel conductor 940 is disposed on top of the flexible membrane 310 and electrically connected to the substrate 420 by means of a through-hole conductor 313 and pad conductor 421. The individual pixel conductors 940 may have a coating of small asperities 314 on the top surface. A parallel plate capacitor is set up between the transparent common conductor 1001 and each individual pixel conductor 940. When the light guidance substrate 201 is deformable, as in FIG. 4B, this alternative embodiment can be realized by disposing the transparent common conductor on the top surface of the light guidance substrate 201. Two factors for consideration may be the thickness of the light guidance substrate 201 and the concomitant voltage required to activate the pixel. Often as thickness increases, so does the voltage required to activate the pixel.

Figure 10B:
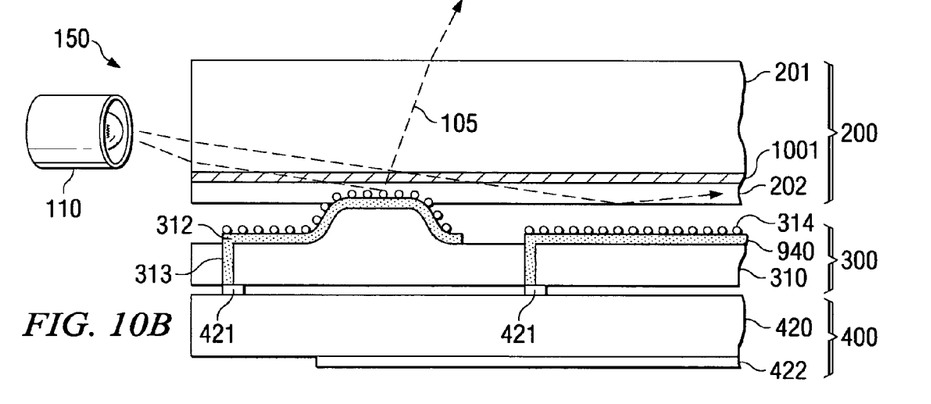

FIG. 10B shows the embodiment in FIG. 10A where the pixel 120 is activated by electrostatic attraction. When a charge is placed on individual pixel conductor 940, it is drawn by Coulomb attraction toward the transparent common conductor 1001. The activated individual pixel conductor 940 presses upward into the deformable elastomer layer 202 creating a localized deformation at the situs of the pixel. Light reflects off of this deformation and is ejected from the light guidance substrate 201.

Figure 11:
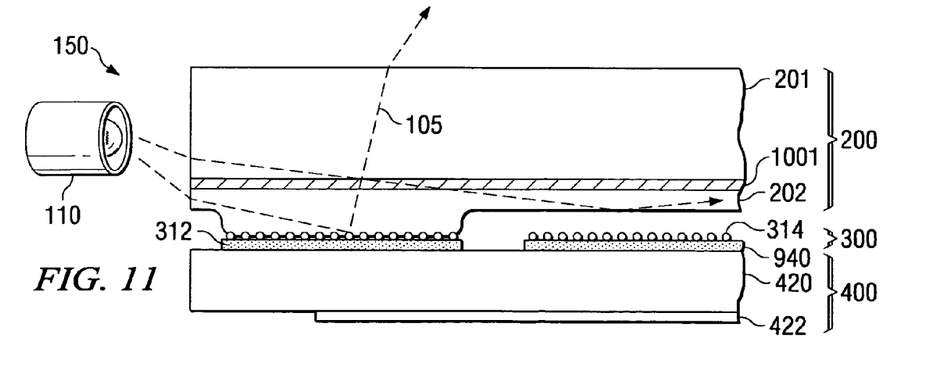
FIG. 11 shows a side view of another example portion of the display where the flexible membrane is comprised of a material that expands under an electrostatic field, such as electroactive polymers (EAP), with an activated pixel according to certain embodiments of the present disclosure.

FIG. 11 shows another embodiment of the portion of the display 100, such as a module 150, wherein the deformable elastomer layer 202 is comprised of a material that expands under the influence of an electrostatic field, such as electroactive polymers (EAP). A transparent common conductor 1001 is disposed on the deformable elastomer layer 202. The need for a flexible membrane is eliminated. The pixel conductors 940 are disposed on the top surface of the substrate 420. This can occasionally be done rather inexpensively using, for example, traditional circuit board printing. The top of each individual pixel conductor 940 may be coated with small asperities 314. A parallel plate capacitor is set up between the transparent common conductor 1001 and each pixel conductor 940. A pixel is activated by placing a charge on the pixel conductor 940. An electrostatic field is set up between the transparent common conductor 1001 and the individual pixel conductor 940. Under the influence of this field, the deformable elastomer layer 202 composed of EAP expands downward, pressing against the pixel conductor 940 and the small asperities 314 that coat its surface. This creates a localized deformation at the situs of the pixel. Light reflects off of this deformation and is ejected from the light guidance substrate 201.

Figure 12A:
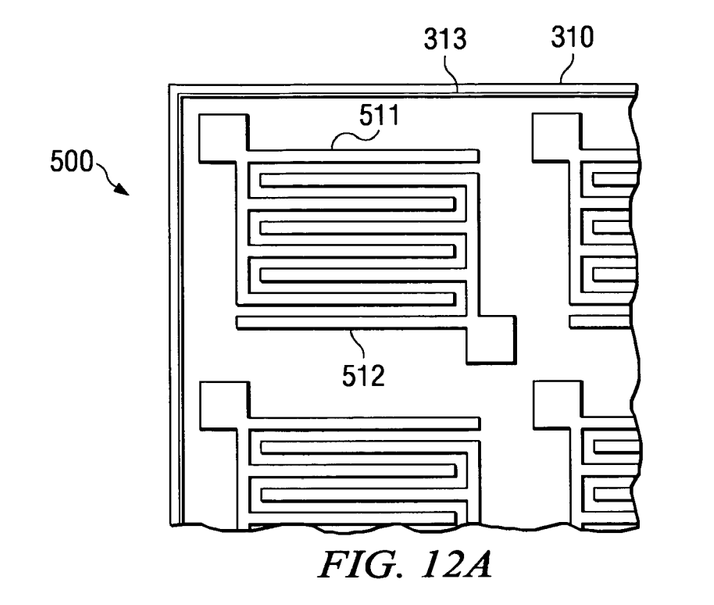
FIGS. 12A-D illustrate another example portion of the display, comprising pairs of pad electrodes disposed on a top surface of a substrate, in the quiescent state and with a pixel activated according to certain embodiments of the present disclosure.
Figure 12B:
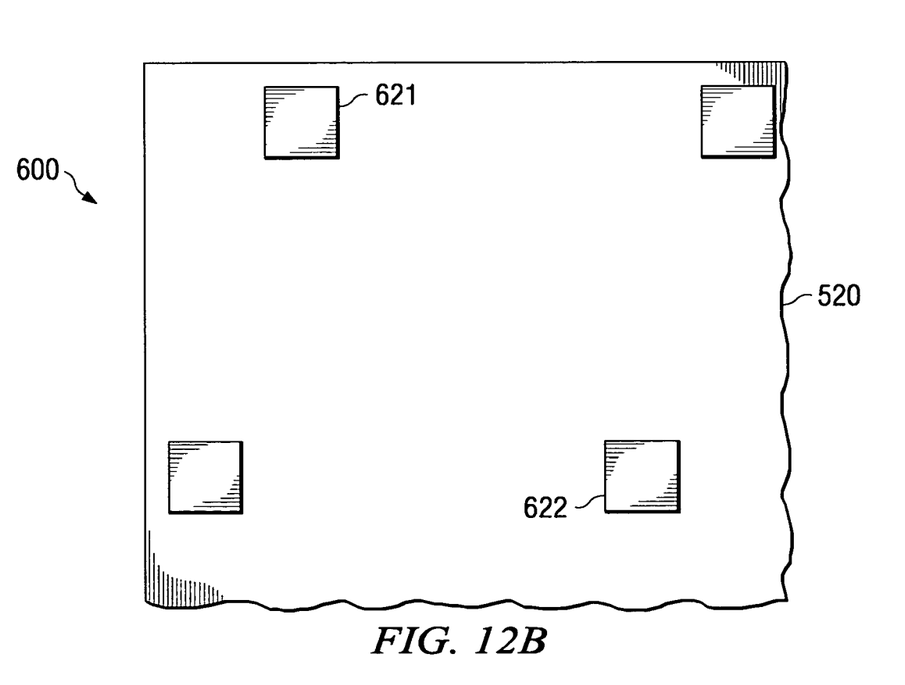
Figure 12C:
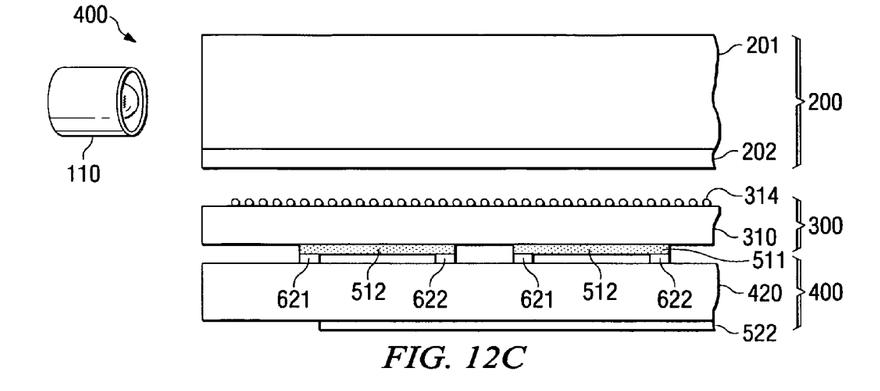
Figure 12D:
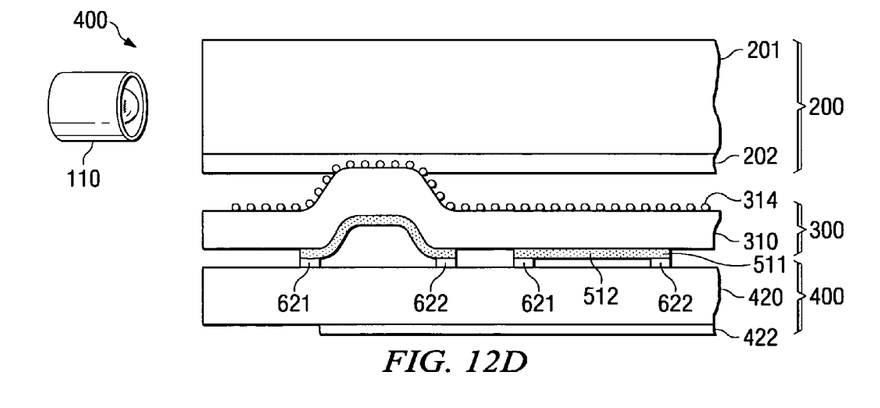

FIGS. 12A-D show another embodiment of the portion of the display 100, such as a module 150. In the illustrated embodiment, pairs of pad electrodes 621 and 622 are disposed on the top surface of a substrate 420. Comb-like coplanar pixel conductors 511 and 512 are also disposed in an interdigitated manner on the "bottom" surface of the flexible membrane 310. Disposing a common conductor in another plane may not be necessary to actuate the flexible membrane 310. Each pixel conductor 511 and 512 comprises an electrical pole. The active layer 500 and the driving layer 600 are disposed so that the pad electrodes 621 make electrical contact with the pixel conductors 511 and pad electrodes 622 make electrical contact with the pixel conductors 512. The flexible membrane 310 is composed of a material that expands under the influence of an electric field, such as EAP. The desired pixel 120 is activated by placing an electric potential between pixel conductor 511 and pixel conductor 512. This causes the flexible membrane 310 to expand, which in turn causes it to buckle upward. The flexible membrane 310 presses into the deformable elastomer layer 202 forming a deformation at the situs of the pixel, as shown in FIG. 12D. Small asperities 314 may be disposed on the top surface of the flexible membrane to provide multiple reflection points. The top surface of the flexible membrane is normally opaque and non-reflective to provide adequate contrast.

Figure 13A:
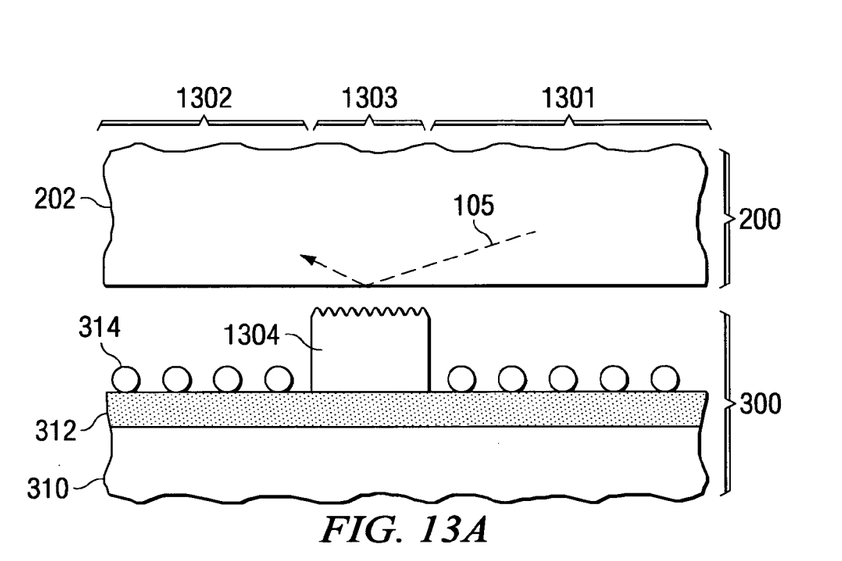
FIGS. 13A-B illustrate an example portion of the display, in the quiescent state and with a pixel activated respectively, utilizing a standoff between two pixels according to certain embodiments of the present disclosure.
Figure 13B:
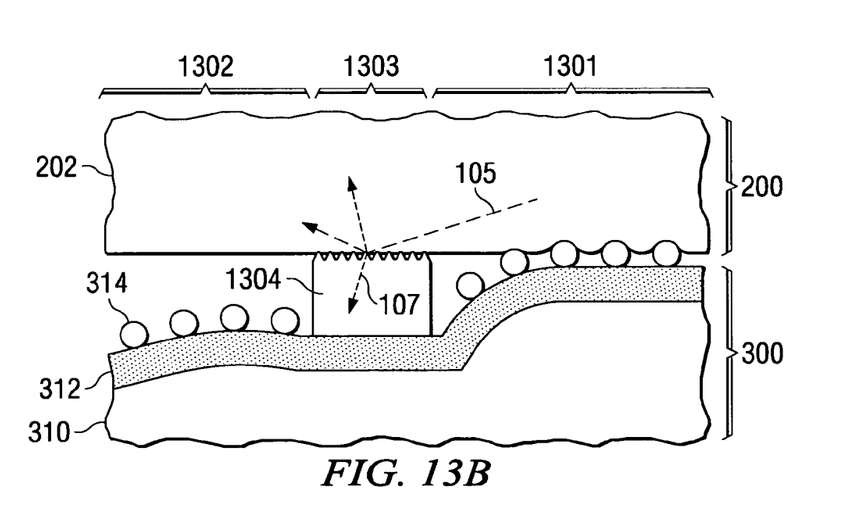

FIGS. 13A-B illustrate an example portion of the display, in the quiescent state and with a pixel activated respectively, utilizing a standoff 1034 between two pixels according to certain embodiments of the present disclosure. Standoff 1304 may comprise any suitable materials such as, for example, silicone, parylene or polyethylene terephthalate. Generally, use of this standoff 1304 between pixels may help mitigate pixel cross talk, which may occur when light is ejected from a pixel 1302 unintentionally due to actuation of an adjacent pixel 1301. Specifically, in some cases, the active layer 300 may bend sharply upward at the margin of a given pixel area, so that it is in full contact with the light guide within the area of the pixel 1301 and not in contact in the surrounding areas outside the particular pixel. Such sharpness of this bending is typically a material property. Thus, to prevent the selectively deformed portion of the active layer 300 from coming into contact with the light guide 200 in the area of an adjacent pixel, the effective size of the pixel can be reduced (or the space between pixels 1303 must be increased). Further, the use of the standoff 1304 between pixels helps enable a "sharper"0 deformation in the active layer 300, thereby possibly reducing the unused space between pixels 1303. In certain embodiments, the light guide 200 may couple into the standoff 1304 when they come into contact, as depicted by light ray 107, upon pixel activation. This can introduce noise into the display and may reduce the contrast ratio of the display. But, in certain cases, light may not effectively couple into a material that has a surface roughness exceeding 100 nanometers, as shown at 1305. Accordingly, if the surface of the standoff that contacts the light guide has a roughness greater than 100 nanometers, then light from the light guide 200 may not follow the path of light ray 107 and noise further reduced.

It will be understood that many of the preceding figures are not drawn to scale in an effort to aid the reader. Further, the preceding description discusses example techniques. But this disclosure contemplates using any suitable technique for performing these and other similar tasks. Accordingly, many of the steps may take place simultaneously and/or in different orders than as shown. Moreover, manufacturers or other parties may use methods with additional steps, fewer steps, and/or different steps, so long as the methods remain appropriate. While various embodiments have been described, it will be understood that various modifications may be made without departing from the spirit and scope of the disclosure. For example, while the terms "bottom" and "top" have been used to more easily describe the display, the display may be oriented in any suitable direction. Indeed, a particular deformable surface of the light guide may not be directly opposite (or parallel to) the surface emitting the light as appropriate. Accordingly, other embodiments are within the scope of the following claims.

What is claimed is:

1. An optical component comprising:
a rigid light guide adapted to conduct light under conditions of total internal reflection;
a deformable layer adapted to conduct light under conditions of total internal reflection, the deformable layer having an upper surface disposed on a first surface of the light guide; and
an active layer disposed in a spaced-apart relationship to the deformable layer, the active layer configured to physically move between an inactive state position and an active state position, wherein during the inactive state position the active layer is positioned in a spaced-apart relationship to the deformable layer, and wherein during the active state position the active layer is selectively repositioned so as to cause a deformation in a lower surface of the deformable layer such that the light within the deformable layer is reflected off the deformation and ejected from some portion of a second surface of the light guide, at least a portion of the active layer coated with a plurality of small asperities.

2. The optical component of claim 1, wherein the deformable layer comprises an elastomer.

3. The optical component of claim 2, wherein the elastomer comprises silicone.

4. The optical component of claim 1, the active layer operable to be actuated by means of electrostatic attraction.

5. The optical component of claim 1, the active layer operable to be actuated by means of piezoelectric deformation.

6. The optical component of claim 1, at least a portion of the active layer comprising a piezoelectric film.

7. The optical component of claim 1, at least a portion of the active layer comprising a plurality of microelectromechanical systems.

8. The optical component of claim 1, at least a portion of the active layer comprising a plurality of nanoelectromechanical systems.

9. The optical component of claim 1, the plurality of small asperities operable to cause multiple reflection points across substantially all of the deformation of the deformable layer.

10. The optical component of claim 1, wherein the deformation is a physical deformation.

11. The optical component of claim 1, wherein the rigid light guide is not deformable.

12. The optical component of claim 1, wherein the deformation is configured so that the light reflected off the deformation is directed to pass through the upper surface of the deformable layer and the first surface of the light guide before crossing a thickness of the light guide to exit from the second surface of the light guide.

13. The optical component of claim 1, wherein the upper surface of the deformable layer and the first surface of the light guide remain parallel to the second surface of the light guide when the lower surface of the deformable layer is deformed by the active layer.

14. The optical component of claim 1, wherein the second surface of the rigid light guide has a curved shape.

15. An optical component comprising:
a light guide adapted to conduct light under conditions of total internal reflection, at least a portion of the light guide being deformable; and
an active layer disposed in spaced-apart relationship to the light guide, the active layer configured to physically move between an inactive state position and an active state position, wherein during the inactive state position the active layer is positioned in a spaced-apart relationship to the deformable layer, and wherein during the active state position the active layer is selectively repositioned so as to cause a deformation in a first surface of the light guide such that the light within the light guide is reflected off the deformation and ejected from some portion of a second surface of the light guide, at least a portion of the active layer coated with a plurality of small asperities, the plurality of small asperities configured to cause multiple reflection points across substantially all of the deformation in the first surface of the light guide.

16. An optical display comprising:
a light source capable of outputting alternating pulses of light;
a light guide coupled with the light source and adapted to conduct light under conditions of total internal reflection, each of a plurality of portions of the light guide being selectively deformable;
an active layer disposed on a deformable first surface of the light guide;
a driving layer coupled with the active layer and operable to selectively deform portions of the active layer such that light is ejected from a second surface of the light guide in a controlled fashion, wherein at least a portion of the active layer is coated with a plurality of small asperities operable to cause multiple reflection points within the light guide to promote the ejection of the light from the second surface of the light guide; and
a plurality of standoffs, each standoff situated between two of the plurality of deformable portions.

17. The optical display of claim 16, at least one of the standoffs having a surface roughness of at least 100 nanometers.

18. The optical display of claim 16, wherein the second surface of the light guide has a curved shape.

19. An optical display comprising:
a light source capable of outputting alternating pulses of light;
a light guide coupled with the light source and adapted to conduct light under conditions of total internal reflection, at least a portion of the light guide being deformable;
a plurality of modular active layers disposed in an arrayed manner and in a spaced-apart relationship to a deformable first surface of the light guide, each of the plurality of modular active layers comprising a plurality of small asperities on the surface of the active layer, the active layer selectively reflects light by contacting the plurality of small asperities with the deformable first surface of the light guide thereby forming multiple reflection points in the deformable first surface of the light guide such that the light within the light guide is reflected off the multiple reflection points and ejected from some portion of a second surface of the light guide; and
a plurality of modular driving layers, each driving layer module coupled with at least one of the modular active layers and operable to selectively deform at least a portion of the particular active layer to cause a deformation in the deformable first surface of the light guide.

20. The optical display of claim 19, the light source outputting infrared light.

21. The optical display of claim 19, wherein the second surface of the light guide has a curved shape.

22. A method for fabricating an optical display comprising:
selecting a rigid light guide adapted to conduct light under conditions of total internal reflection;
selecting a deformable layer adapted to conduct light under conditions of total internal reflection, the deformable layer having an upper surface disposed on a first surface of the light guide, the entire upper surface parallel to a second surface of the light guide;
coupling a light source capable of outputting alternating pulses of light to the light guide; and
arranging a plurality of modules on the deformable layer, each module comprising an active layer and a driving layer, wherein the active layer is disposed on a lower surface of the deformable layer such that upon selective deformation of the active layer by the driving layer the active layer forms a deformation in the lower surface of the deformable layer that reflects the light and causes the light to eject from the second surface of the light guide, at least a portion of the active layer coated with a plurality of small asperities, the plurality of small asperities configured to cause multiple reflection points across substantially all of the deformation of the deformable layer.

23. The method of claim 22, wherein the light guide is manufactured by a first manufacturer and at least a portion of the modules are manufactured by a second manufacturer.

24. The method of claim 22, wherein the deformable layer comprises a deformable elastomer layer.

25. The method of claim 22, further comprising using a computer to cause the light source to output alternating pulses of light to the light guide.

26. The method of claim 22, further comprising using a computer to selectively apply a stimuli to the active layer to cause the selective deformation of the active layer.

27. The method of claim 26, the stimuli being selected from one of the following:
electrostatic attraction;
electromagnetic attraction;
electromagnetic repulsion;
piezoelectric deformation;
thermal expansion; and
thermal contraction.

28. The method of claim 22, wherein the second surface of the rigid light guide has a curved shape.

29. An optical component comprising:
a light guide adapted to conduct light under conditions of total internal reflection;
a deformable layer adapted to conduct light under conditions of total internal reflection, the deformable layer having an upper surface disposed on a first surface of the light guide, the entire upper surface parallel to a second surface of the light guide; and
an active layer comprising a plurality of small asperities on the surface of the active layer, the active layer disposed in a spaced-apart relationship to the deformable layer, the active layer configured to physically move between an inactive state position and an active state position, wherein during the inactive state position the active layer is positioned in a spaced-apart relationship to the deformable layer, and wherein during the active state position the active layer is repositioned so as to selectively reflect light by contacting the plurality of small asperities with a lower surface of the deformable layer thereby forming multiple reflection points in the lower surface of the deformable layer such that the light within the deformable layer is reflected off the multiple reflection points and ejected from some portion of the second surface of the light guide.

30. The optical component of claim 29, wherein the deformable layer comprises an elastomer.

31. The optical component of claim 30, wherein the elastomer comprises silicone.

32. The optical component of claim 29, wherein the small asperities comprise glass.

33. The optical component of claim 29, the active layer operable to be actuated by means of electrostatic attraction.

34. The optical component of claim 29, the active layer operable to be actuated by means of piezoelectric deformation.

35. The optical component of claim 29, at least a portion of the active layer comprising an electro-active polymer.

36. The optical component of claim 29, further comprising an anisotropic conductive film adhesive on at least a portion of the active layer.

37. An optical component comprising:
a light guide adapted to conduct light under conditions of total internal reflection;
a deformable layer adapted to conduct light under conditions of total internal reflection, the deformable layer having an upper surface disposed on a first surface of the light guide, wherein the first surface of the light guide is not deformable; and
an active layer disposed in a spaced-apart relationship to the deformable layer, the active layer configured to physically move between an inactive state position and an active state position, wherein during the inactive state position the active layer is positioned in a spaced-apart relationship to the deformable layer, and wherein during the active state position the active layer is selectively repositioned so as to cause a deformation in a lower surface of the deformable layer such that the light within the deformable layer is reflected off the deformation and ejected from some portion of a second surface of the light guide, wherein at least a portion of the active layer is coated with a plurality of small asperities.

38. The optical component of claim 37, wherein the first surface of the light guide does not deform in response to deformation of the lower surface of the deformable layer by the active layer.

39. The optical component of claim 38, wherein the deformation is a physical deformation.

40. The optical component of claim 39, wherein the deformation is configured so that the light reflected off the deformation is directed to pass through the upper surface of the deformable layer and the first surface of the light guide before crossing a thickness of the light guide to exit from the second surface of the light guide.

41. The optical component of claim 37, wherein the upper surface of the deformable layer and the first surface of the light guide remain completely parallel to the second surface of the light guide when the lower surface of the deformable layer is deformed by the active layer.

42. The optical component of claim 37, wherein the active layer is actuated by means of thermal expansion.

43. The optical component of claim 37, wherein at least a portion of the active layer comprises an electro-active polymer.

44. The optical component of claim 37, wherein the active layer is actuated by means of electrostatic attraction.

45. The optical component of claim 37, the plurality of small asperities configured to cause multiple reflection points across substantially all of the deformation of the deformable layer.

46. An optical display comprising:
a light guide adapted to conduct light under conditions of total internal reflection;
a deformable layer adapted to conduct light under conditions of total internal reflection, the deformable layer having an upper surface disposed on a first surface of the light guide; and
an active layer disposed in a spaced-apart relationship to the deformable layer, the active layer configured to physically move between a pixel inactivation state and a pixel activation state, wherein during the pixel inactivation state the active layer is positioned in the spaced-apart relationship to the deformable layer, and wherein during the pixel activation state the active layer is selectively repositioned so as to cause a deformation in a lower surface of the deformable layer, the active layer further comprising a plurality of small asperities on the surface of the active layer, wherein during the pixel activation state the active layer reflects light by contacting the plurality of small asperities with the lower surface of the deformable layer thereby forming multiple reflection points in the lower surface of the deformable layer such that the light within the deformable layer is reflected off the multiple reflection points and ejected from some portion of the second surface of the light guide.

* * * * *